United States Patent [19]

Chang et al.

[11] 3,975,457

[45] Aug. 17, 1976

[54] THERMOPLASTIC EXTENSIBLE COATING COMPOSITIONS

[75] Inventors: Wen-Hsuan Chang, Gibsonia; Samuel Porter, Jr., Tarentum, both of Pa.

[73] Assignee: PPG Industries, Inc., Pittsburgh, Pa.

[22] Filed: Nov. 14, 1974

[21] Appl. No.: 523,780

Related U.S. Application Data

[63] Continuation-in-part of Ser. No. 399,596, Sept. 21, 1973, abandoned.

[52] U.S. Cl. ............................. 260/859 R; 428/425
[51] Int. Cl.$^2$ ................................. C08L 75/08
[58] Field of Search ................ 260/859 R, 77.5 AP

[56] References Cited
UNITED STATES PATENTS

| | | | |
|---|---|---|---|
| 3,028,367 | 4/1962 | O'Brien | 260/859 |
| 3,297,745 | 1/1967 | Fekete | 260/77.5 AP |
| 3,448,172 | 6/1969 | Damusis | 260/859 |
| 3,457,324 | 7/1969 | Sekmakas | 260/859 |
| 3,509,234 | 4/1970 | Burlant | 260/859 |
| 3,531,364 | 9/1970 | Schmidle | 260/859 |
| 3,595,838 | 7/1971 | Ogino | 260/859 |
| 3,597,495 | 8/1971 | Sekmakas | 260/859 |
| 3,641,199 | 2/1972 | Niederhauser | 260/859 |
| 3,642,943 | 2/1972 | Noel | 260/859 |
| 3,690,946 | 9/1972 | Hartmann | 260/859 |
| 3,694,415 | 9/1972 | Honda | 260/859 |
| 3,719,638 | 3/1973 | Huemmer | 260/859 |
| 3,829,531 | 8/1974 | Graff | 260/859 |
| 3,850,770 | 11/1974 | Juna | 260/859 |

*Primary Examiner*—Murray Tillman
*Assistant Examiner*—W. C. Davison, Jr.
*Attorney, Agent, or Firm*—William J. Uhl

[57] ABSTRACT

Thermoplastic coatings have a high degree of extensibility, gloss retention, good sprayability and other desirable properties are obtained from ungelled, storage-stable compositions comprising the reaction product of (A) an interpolymer of a hydroxyalkyl ester of an ethylenically unsaturated carboxylic acid and a copolymerizable compound, (B) an organic polyisocyanate, and (C) a polymeric polyol of low glass transition temperature. Rather than using the interpolymer itself, it is also possible to form useful products by reacting (B) and (C) with a hydroxyalkyl ester monomer in combustion with another copolymerizable monomer. These compositions when used as coatings are adherent, durable and highly extensible. The coatings are particularly useful on resilient and rubbery substrates such as foam rubber, polyurethane foams and vinyl foam and on metal surfaces such as mild steel and aluminum.

15 Claims, No Drawings

THERMOPLASTIC EXTENSIBLE COATING COMPOSITIONS

CROSS-REFERENCE TO RELATED APPLICATIONS

This application is a continuation-in-part of copending application Ser. No. 399,596, filed Sept. 21, 1973, now abandoned.

BACKGROUND OF THE INVENTION

Recent advances in coating technology have provided coatings which are suitable for use over various substrates which are difficult to coat and which have many different properties. Coatings of excellent appearance, a high order of durability and having the ability to withstand severe environmental conditions have been obtained. Among the more advanced coatings are those employed on vehicles, such as automobiles, where good appearance must be maintained over long periods despite exposure to weather and various forms of attack during use.

Recently, there has been interest in the use of rubbery, resilient materials for areas which are subject to mechanical shock, such as automobile bumpers and moldings, exposed corners and surfaces of industrial machines, kickplates and other areas of doors and entrances, and the like. The use of such materials aids in providing protection against permanent structural damage, but in order to attain the desired appearance, a decorative and protective coating must be applied to the surface and this coating can also be damaged during use. Conventional coatings, including those employed on rubber and similar extensible objects heretofore, do not have the required combination of properties. These necessary properties include:

1. Extensibility - This property is necessary in order that the advantage of the resilient substrate can be utilized without destruction of the integrity of the surface of the coating.

2. Tensile Strength - A high degree of tensile strength is also necessary in order to avoid rupture of the film during use.

3. Package Stability - In order to permit ease of application, the liquid coating composition should be stable for extended periods under ambient conditions without either gelation or depolymerization of the resin contained therein.

4. Film Stability - Certain coatings which are extensible and which have a relatively high tensile strength lose these properties upon aging and particularly if the coating is exposed to sunlight, weathering, etc.

5. Impact Resistance - The coating should have adequate impact resistance at various temperatures as encountered in extreme weather variations, including temperatures as low as −20°F. and as high as 120°F.

6. Adhesion - The coating should have satisfactory adhesion to the various substrates with which it is to be employed, including extensible materials such as foams, rubber and the like, and metals such as mild steel. In addition, the coatings should have satisfactory intercoat adhesion with succeeding coats or with various primers which can be employed.

7. Chemical and Humidity Resistance - This includes properties such as saponification resistance upon exposure to acids and alkalis, resistance to various solvents and resistance to atmosphere of high humidity and heat.

8. Resistance to Cracking Under Temperature-Humidity Cycling This property is important where the coating might be exposed to rapid variations in temperature and humidity as might be encountered by automobiles during travel or storage. This property is tested by successively exposing the coated object to conditions of high temperature and high humidity, alternated with exposure to low temperature and low humidity.

Still other properties which are important for commercial applicability include non-toxicity and low sensitivity to moisture.

Finally, the compositions must possess sprayability at reasonable solids content (i.e., > 5 percent). Sprayability, as it is recognized in the art, is a measure of the minimum amount of solvent necessary to atomize a polymer system sufficiently to produce a uniform coating film. The measure itself is usually expressed (and is expressed herein) as a percent solids. Thus, a sprayability of 5 percent solids would denote a system requiring 95 parts of solvent per 5 parts of solids to atomize. If the solvent concentration is below minimum, the polymer will form a stringy, webbed, spray pattern. The sprayability of a resin will generally be a close indication of the sprayability of the paint or coating formulation.

It is especially difficult to obtain the above properties in combination since, in most instances, the obtention of one or several of the properties desired requires the use of materials and formulations which under ordinary circumstances tend to make the other desired properties less satisfactory.

SUMMARY OF THE INVENTION

The present invention is a storage-stable, ungelled, thermoplastic coating composition which comprises the reaction product of:

A. an organic polyisocyanate;
B. A polymeric polyol having a glass transition temperature of less than about 50°C.;
C. an interpolymer of:
 1. a hydroxyalkyl ester of an ethylenically unsaturated carboxylic acid; and
 2. at least one copolymerizable ethylenically unsaturated monomer;

the reaction product having an intrinsic viscosity of 1.2 deciliters per gram or less.

The invention also includes a storage-stable, ungelled, thermoplastic coating composition which comprises the reaction product of:

A. an organic polyisocyanate;
B. a polymeric polyol having a glass transition temperature of less than about 50°C.;
C. a hydroxyalkyl ester of an ethylenically unsaturated carboxylic acid; and
D. at least one copolymerizable ethylenically unsaturated monomer; the reaction product having an intrinsic viscosity of 1.2 deciliters per gram or less.

The invention also includes a method for producing such an ungelled, storage-stable, thermoplastic coating composition which comprises:

A. reacting a mixture of:
 1. an organic polyisocyanate with
 2. a polymeric polyol having a glass transition temperature of less than about 50°C. and
 3. an interpolymer of:
  i. a hydroxyalkyl ester of an ethylenically unsaturated carboxylic acid; and ii. at least one copolymerizable ethylenically unsaturated monomer, B. terminating the reaction when the intrinsic viscosity of the reaction mixture is 1.2 deciliters per gram or less.

Also, the method of the invention can be practiced by:

A. reacting a mixture of:
1. an organic polyisocyanate;
2. a polymeric polyol having a glass transition temperature of less than about 50°C.;
3. a hydroxyalkyl ester of an ethylenically unsaturated carboxylic acid; and
4. at least one copolymerizable ethylenically unsaturated monomer;

B. terminating the reaction when the intrinsic viscosity of the reaction mixture is 1.2 deciliters per gram or less.

By the language "storage-stable, ungelled" is meant that the reaction product will maintain its intrinsic viscosity of 1.2 deciliters per gram or less for an extended period of time at ambient temperature, for example, 6 months at 20°-30°C.

DETAILED DESCRIPTION OF THE INVENTION

The thermoplastic compositions of the invention comprise either the reaction product of (A) an organic polyisocyanate, (B) a polymeric polyol having a glass transition temperature below about 50°C. and (C) an interpolymer of a hydroxyalkyl ester of an ethylenically unsaturated carboxylic acid and one or more copolymerizable ethylenically unsaturated compounds or, the reaction product of (A) an organic polyisocyanate, (B) a polymeric polyol having a glass transition temperature below about 50°C., (C) a hydroxyalkyl ester of an ethylenically unsaturated carboxylic acid, (D) at least one other ethylenically unsaturated copolymerizable monomer.

The interpolymer of the instant invention is an interpolymer of a hydroxyalkyl ester of an ethylenically unsaturated carboxylic acid and one or more copolyerizable ethylenically unsaturated compounds. The molecular weight of the interpolymer should be at least about 10,000 and preferably should be between about 20,000 and about 400,000. The interpolymer should also have a hydroxyl value of about 60 or less and preferably between about 10 and about 40.

The preferred interpolymers are those containing hydroxyl groups derived from monoacrylates or methacylates of a diol such as hydroxyalkyl acrylates and methacrylates. Examples include acrylic acid and methacrylic acid esters of ethylene glycol and 1,2-propylene glycol, such as hydroxyethyl acrylate, hydroxyethyl methacrylate, hydroxypropyl acrylate and hydroxypropyl methacrylate. Other useful hydroxyalkyl esters include hydroxybutyl acrylate, hydroxyoctyl methacrylate, polyethylene glycol monoacrylate and polycarprolactone diol or polyol monoacrylate. Also useful are the hydroxy-containing esters of such unsaturated acids as maleic acid, fumaric acid, itaconic acid, and the like. The hydroxy-containing monomer generally has a molecular weight in the range of about 100 to about 400. Where it is desired to utilize a hydroxyalkyl ester monomer rather than the interpolymer, any of the above-described hydroxyalkyl esters may be used.

The monomer or monomers with which the hydroxyalkyl ester is interpolymerized or which can be used in lieu of the interpolymer can be any ethylenically unsaturated compound copolymerizable with the ester, the polymerization taking place through the ethylenically unsaturated linkages. These include monoolefinic and diolefinic hydrocarbons, halogenated monoolefinic and diolefinic hydrocarbons, unsaturated esters of organic and inorganic acids, amides and esters of unsaturated acids, nitriles of unsaturated acids, and the like. Examples of such monomers include methyl methacrylate; acrylamide; acrylonitrile; styrene, butadiene-1,3; 2-chlorobutene; alpha methyl styrene; alpha-chlorostyrene; 2-chloro-1,3-butadiene; 1,1-dichloroethylene; vinyl butyrate; vinyl acetate; allyl chloride; dimethyl maleate; divinyl benzene; diallyl itaconate; triallyl cyanurate; blends thereof, and the like.

While the amounts of hydroxyalkyl ester and copolymerizable monomer or monomers used in making the interpolymer may be varied over a wide range, it is preferable that the ester constitute from about 75 to about 99 percent by weight of the interpolymer. One particularly preferred interpolymer comprises 95 percent methyl methacrylate and 5 percent hydroxypropyl methacrylate.

The molecular weight of the interpolymer can be controlled by any of the well known techniques in the art, including the use of small amounts of catalyst or the use of chain transferring agents such as dodecyl mercaptan.

The polyisocyanate which is reacted with the polymeric polyol and the interpolymer or the hydroxyalkyl ester and monomer can be essentially any organic polyisocyanate, for example, hydrocarbon polyisocyanates or substituted hydrocarbon diisocyanates. Many such organic polyisocyanates are known in the art, including p-phenylene diisocyanate, biphenyl diisocyanate, toluene diisocyanate, 3,3'-dimethyl-4,4-biphenylene diisocyanate, 1,4-tetramethylene diisocyanate, hexamethylene diisocyanate, 2,2,4-trimethylhexane-1,6-diisocyanate, methylene bis(phenyl isocyanate), lysine methyl ester diisocyanate, bis(isocyanatoethyl)fumarate, isophorone diisocyanate. There can also be employed isocyanate-terminated adducts of diols, such as ethylene glycol, 1,4-butylene glycol, polyalkylene glycols, and the like. These are formed by reacting more than one mole of a diisocyanate, such as those mentioned, with one mole of a diol to form a longer chain diisocyanate. Alternatively, the diol can be added along with the diisocyanate.

While diisocyanates are preferred, higher polyisocyanates can be utilized as part of the organic polyisocyanate. Examples are 1,2,4-benzene trisiocyanate and polymethylene polyphenyl isocyanate.

It is preferred to employ an aliphatic diisocyanate, since it has been found that these provide better color stability in the finished coating. Examples include bis-(isocyanatocyclohexyl)methane, 1,4-butylene diisocyanate and methylcyclohexyl diisocyanate.

The polymeric polyol to be used has a glass transition temperature of below about 50°C. The method of measuring the glass transition temperature of a polymeric polyol will depend upon the molecular weight and other physical properties. If the molecular weight is high, the Tg is usually measured with a penatrometer (Instruction Manual, "DuPont 900 Differential Thermal Analyzer Accessories", 1968, Section 11–8). For low molecular weight crystalline polyols, the well-known relationship Tg/Tm = 3/2 (Tm = melting point) can be used. For non-crystalline polyols, if the Tg is below about 50°C., the polyol will flow below that temperature. Many Tg values for various polyols are available in the literature. Also helpful in determining the Tg is the well-known Clash-Berg method described in *ADVANCES IN POLYURETHANE TECHNOLOGY*, Burst et al, Wiley and Sons, 1963, pages 84 ff.

Among the preferred polymeric polyols are polyether polyols; especially preferred are poly(oxyalkylene)-glycols such as poly(oxyethylene glycol), poly(oxypropylene glycol), and other such polyols having up to 6 carbon atoms separating each pair of oxygen atoms. A specific preferred polyol is poly(oxytetramethylene) glycol.

Other highly desirable polymeric polyols are polyester polyols having the desired glass transition temperature, especially those produced from acyclic reactants such as adipic acid and azelaic acid and alkylene glycols, for example, poly(neopentyl adipate). It is desirable in some cases to include small amount of cyclic compounds in the formation of the polyester polyols of this invention, and for this purpose, up to about 20 percent by weight of cyclic acids and/or alcohols may be used, provided that the Tg of the polyol is kept below about 50°C. Still other polymeric polyols of suitable properties include condensates of lactones and poly-alcohols, such as those produced from caprolactone and ethylene glycol, propylene glycol, trimethylolpropane, and the like. In general, the polyols used should have molecular weights between about 200 and about 5,000, and preferably from about 850 to about 1,500.

Also useful are soft polymeric acrylic polyols having a glass transition temperature less than 50°C., such as interpolymers of hydroxyalkyl acrylates and methacrylates and large amounts of other copolymerizable materials such as lauryl methacrylate, 2-ethylhexyl acrylate, n-butyl acrylate, and the like. If a soft acrylic polyol is used, the polyol must have a glass transition temperature of at least 10° C. lower than that of the interpolymer described above, which is reacted with the isocyanate and the polymeric polyol.

Polyurethane polyols such as those prepared by reacting any of the above polyols with a minor amount of polyisocyanate (OH/NCO ratio greater than 1:1) so that free hydroxy groups are present in the product may also be used herein. Polyurethane polyols can be used effectively in preventing crosslinking or gelation of the reaction product. The use of polyurethane polyols permits the incorporation of a large percentage of urethane groups into the reaction product while minimizing the potential for gelling which would ordinarily occur if the same high percentage of urethane groups were introduced into the reaction product through the use of high amounts of polyisocyanate. Such a situation would result in a high ratio of unreacted —NCO groups in the reaction mixture, a situation prone to the crosslinking and gelling. This tendency for crosslinking could, of course, be minimized if the amount of polyisocyanate in the reaction mixture would be kept low. However, this would create a situation where few urethane linkages would be present in the resultant reaction product resulting in inferior physical and chemical properties. However, if urethane linkages are incorporated into the polyol moieties of the polymer, this permits the use of relatively little reactive polyisocyanate (toward the polyacrylate), thereby minimizing the tendency for gelation, while at the same time insuring that there will be sufficient urethane linkages in the polymer for good physical and chemical properties.

It is also noted that low molecular weight polyols having a molecular weight of about 200 or less, such as ethylene glycol, ester-containing diols, and the like may also be added as part of or all of the polymeric polyol component. The use of the term "polymeric polyol" is meant to include such materials.

The reaction product of the invention may be obtained by any number of processes. For example, the isocyanate and polymeric polyol may be pre-reacted to form an isocyanate-terminated prepolymer and subsequently reacted with the interpolymer, or, the interpolymer, isocyanate and polyol may be reacted together simultaneously where a hydroxyalkyl ester monomer and other monomer or monomers are used in lieu of the interpolymer, the sequence of reaction can be equally varied. The sequence of reactive steps is selected so that gelation can be avoided. Further, all the reactions may be conducted at room temperature or higher and in the presence or absence of catalysts such as tin catalysts, tertiary amines and the like.

In order to produce an ungelled, solvent-soluble product, it is important that the equivalent ratio of isocyanate groups to hydroxyl groups be carefully controlled. For example, when the isocyanate and polymeric polyol are pre-reacted to make the NCO-terminated prepolymers, proportions of each may be varied greatly but the equivalent ratio of hydroxyl groups to isocyanate groups should be from 1:1.1 to about 1:3, preferably 1:1.2 to 1:2, to prevent gelation when the prepolymer is reacted with the interpolymer. To insure against gelation, some monofunctional amine or alcohol should be added to reduce the functionality of the prepolymer.

The conditions of reaction between the NCO prepolymer and the interpolymer or among the NCO prepolymer and the hydroxyalkyl ester of an ethylenically unsaturated carboxylic acid and at least one ethylenically unsaturated monomer copolymerizable therewith, or among the organic polyisocyanate, the polymeric polyol and the hydroxyalkyl ester of an ethylenically unsaturated carboxylic acid and at least one ethylenically unsaturated monomer copolymerizable therewith are controlled so as to produce an ungelled urethane reaction product. An ungelled product will be free or unreacted NCO groups as determined by infrared analysis. Usually, the urethane reaction product contains hydroxyl groups. To be sure of producing an ungelled urethane reaction product, the equivalent ratio of isocyanate groups of hydroxyl groups in the reactants should be less than 1:1, usually maintained between 1:1 to 1:9, and allowing substantially all of the isocyanate groups to react. However, NCO/OH equivalent ratios as low as 1:75 may be necessary to prevent gelation. For example, with acrylic interpolymers having high hydroxyl equivalents, i.e., about 4000, have a greater tendency to cause gelation than lower hydroxyl equivalent interpolymers. In such cases, the NCO/OH ratio must be kept low to avoid gelation. See Examples XIV–XV infra. When using ratios of about 1:1 or slightly lower, care must be taken to avoid gelation and for this reason, an NCO group chain terminator is preferably used. It should be mentioned that where NCO/OH equivalent ratios are mentioned, ratios exclusive of NCO group chain terminator are intended. Also, the ratio is a calculated value and not an actual value. Further, where NCO equivalents and OH equivalents are mentioned, calculated and not actual values are meant.

It is in most cases preferable to terminate the reaction at the desired stage of viscosity, that is, when the polymer has an intrinsic viscosity of 1.2 deciliters per gram or less by the addition of a chain terminator which reacts with any remaining isocyanate groups. While a terminating agent should be used when the equivalent ratio of hydroxyl groups to isocyanate groups is about 1:1 or slightly higher, it is preferable also to use such agents even when the equivalent ratio is substantially higher than 1:1. Examples of suitable terminating agents include primary and secondary amines such as butyl amine, morpholine, allyl amine and diethylamine; monofunctional alcohols such as n-butanol and the like. It is noted that the amount of terminating agent added in all cases is such that the equivalent ratio of the remaining isocyanate groups to the isocyanate-reactive groups of the terminating agent is less than about 1. It should be mentioned in certain instances, with the proper selection of reactants, catalyst and reaction conditions, the reaction may be "self-terminating" at the desired stage of viscosity, that is, all the NCO groups have reacted without the reaction product gelling. Therefore, where it is mentioned in the specification and claims that the reaction can be terminated, a self-terminating system as well as a system employing a special NCO group chain terminator such as described above are intended. Also, it should be mentioned that when an NCO group chain terminator is used, it can be used, not only at the conclusion of the reaction, but can also be used at the beginning of the reaction by being added to the initial charge.

In one preferred embodiment of the invention, a polyfunctional alcohol is used to terminate the reaction at the desired stage (determined by the intrinsic viscosity mentioned above), thereby also contributing residual hydroxyl groups to the product. Particularly desirable for such purposes are amino-alcohols, such as ethanol-amine, diethanol amine, propanol amine, hydroxyethyl morpholine and the like. The amino groups react preferentially with the isocyanate groups present. Polyols such as ethylene glycol can also be employed in this manner.

It is in most cases preferable to utilize an amino alcohol which contains a primary amine group (for example, ethanol amine), either alone or in combination with one or more other terminating agents. The presence of a primary amine-containing amino alcohol with other terminating agents greatly increases the terminating efficiency of such agent or agents.

Thus, as has been mentioned above, the ungelled polyurethane reaction product usually contains hydroxyl groups with the hydroxyl value of the urethane reaction being at least about 10 and in most cases from about 20 to 200. The hydroxyl value of the polyurethane reaction product can be determined by ASTM designation E-222-67, Method B.

Useful products are provided in accordance with the invention once the reaction begins when the intrinsic viscosity of the polymer is within the range of between .01 to about 1.2 deciliters per gram. Generally to start the reaction, heat (for example, about 120°F. or higher) and catalyst (for example, dibutyltin dilaurate) are used.

The reaction is terminated when the intrinsic viscosity is within the range mentioned immediately above. It has been found that resins having intrinsic viscosities much above 1.2 deiliters per gram have extremely poor sprayabilities and resins having intrinsic viscosities below about 0.01 deciliter per gram are insufficiently polymerized to have good physical and chemical properties for coating applications. Thus, when the reaction is stopped at an intrinsic viscosity within the range of 0.01 to 1.2 deciliters per gram, the composition can be sprayed at relatively high percent solids and the resulting sprayed coating composition will have excellent chemical and physical properties.

The intrinsic viscosity of the various resins are determined by art-recognized methods. Thus, the intrinsic viscosity of the resins of the present invention may be determined by first dissolving the resins in N-methyl pyrrolidone or other suitable solvent at a concentration of from 8 to 30 percent. This solution is further thinned with dimethyl formamide to 0.5 percent and 0.25 concentrations. The resins may then be passed to a capillary viscometer to determine their reduced viscosities.

The intrinsic viscosity can then be determined by the following equation:

$$[\mu] = [\mu \text{ reduced}]_{c=0} = [\mu \text{ reduced}]_{0.25} + [[\mu \text{ reduced}] - [\mu \text{ reduced}]] = 2[\mu \text{ reduced}]_{0.25} - [\mu \text{ reduced}]_{0.50}$$

where $[\mu]$ is intrinsic viscosity and $[\mu \text{ reduced}]_{0.25}$ is the viscosity of 0.25 percent concentration and $[\mu \text{ reduced}]_{0.50}$ is the viscosity of 0.50 concentration. The general methods for determining intrinsic viscosities are described in the art such as in the *Textbook of Polymer Science*, Billmeyer, Interscience Publishers, New York (1957), pages 79–81.

The sprayabilities of the various resins are determined by art-recognized methods. Thus, the resins are first dissolved in N-methyl pyrrolidone or other suitable solvents are concentrations of from about 8 to 30 percent. The resins are then further thinned by a mixture of two parts of methylethyl ketone, and two parts of n-butanol and one part of cellulose acetate (all parts by volume). The sprayability can then be determined by using a spray gun such as an air suction spray gun operating at 60 psi with the No. 30 air cap. The sprayability of the resin is defined as the maximum concentration of the resin in solution such that the resin can be atomized sufficiently to form a uniform film. The higher the sprayability, the greater the solids content of the resin in the spraying soluton. High sprayabilities are obviously desirable. Above the maximum concentration, the resin solution, upon spraying, strings out and gives a web-like spray pattern.

The amount of each component in the composition may be varied over a wide range. When using the above-described interpolymer, it is preferable that the interpolymer comprise from about 30 to about 95 percent by weight of the composition, that the polyisocyanate comprise from about 1 to about 30 percent by weight of the composition, and that the polymeric polyol comprise from about 4 to about 50 percent by weight of the composition. If the interpolymer itself is not used, it is preferred that the polyisocyanate comprise from about 1 to about 30 percent by weight of the composition, that the polymeric polyol comprise from about 4 to about 50 percent by weight of the composition, that the hydroxyalkyl ester comprise from about 2 to about 20 percent by weight of the composition, and that the other monomers comprise from about 25 to about 90 percent by weight of the composition.

In addition to the components above, the compositions ordinarily contain other optional ingredients, including any of the various pigments ordinarily utilized in coatings of this general class. In addition, various fillers, plasticizers, antioxidants, flow control agents, surfactants, and other such formulating additives can be employed in many instances. The composition is ordinarily contained in a solvent, which can be any solvent or solvent mixutre in which the materials employed are compatible and soluble to the desired extent. Examples of suitable solvents include ketones such as methylethyl ketone, methylisobutyl ketone, compounds such as N-methyl pyrrolidone, chloroform and toluene, xylene, and ethyl acetate. Usually the solvent constitutes about 40, and usually 50–90 percent by weight of the reaction mixture based on total weight of the reaction mixture and solvent.

The compositions herein can be applied by any conventional method, including brushing, dipping, flow coating, and the like, but they are most often applied by spraying. Usual spray techniques and equipment are utilized. They can be applied over virtually any substrate, including wood, metals, glass, cloth, plastics, foams, and the like, as well as over various primers.

The invention will be further described in connection with several examples which follow. These examples are given as illustrative of the invention and are not to be construed as limiting it to their details. All parts and percentages in the examples and throughout the specification are by weight unless otherwise indicated.

EXAMPLE I

A reactor was charged with 1760 parts of bis-(isocyanatocyclohexyl) methane (HYLENE W, E. I. DuPont Chemical Co.), 5760 parts of a polycaprolactone diol (having a molecular weight of 1250), 2000 parts of methyl butyl ketone and 0.08 parts of dibutyltin dilaurate. The reactants were heated at 100°C. for two hours in a nitrogen atmosphere to produce an isocyanate prepolymer having a Gardner-Holdt viscosity of $Z_4$-$Z_5$ and an NCO equivalent of 2183.

A second reactor was charged with 400 parts of VMP naphtha (boiling point ~120°C.) and 400 parts of methyl butyl ketone, and heated to reflux in a nitrogen atmosphere. After about 30 minutes at 120°C., the following blend was gradually added to the reactor:

|  | Parts by Weight |
| --- | --- |
| Methyl methacrylate | 1080 |
| Methacrylonitrile | 231 |
| Lauryl methacrylate | 100 |
| Hydroxyethyl acrylate | 150 |
| Butyl methacrylate | 100 |
| Azobisisobutyronitrile (VAZO) | 15 |
| Methyl butyl ketone | 600 |

The addition of the blend was complete after about three hours. To the reaction mixture was gradually added a blend consisting of 150 parts of VMP naphtha, 150 parts of methyl butyl ketone and 5 parts of azobisisobutyronitrile. The addition was complete after about one hour. The reaction mixture was held at about 120°C. for another hour, after which were added 6 parts of butylperoxy isopropyl carbonate (BPIC). The temperature was maintained at about 120°C. for 4 more hours after which the product was allowed to cool. The resultant acrylic interpolymer had a hydroxyl value of about 48 and a hydroxyl equivalent of 1168.

The isocyanate prepolymer and the acrylic interpolymer were then charged to a reactor and blended as follows:

|  | Parts by Weight |
| --- | --- |
| Isocyanate prepolymer | 580 |
| Acrylic interpolymer | 620 |
| Methyl butyl ketone | 320 |
| Isopropanolamine | 6.0 |
| Dibutyltin dilaurate | 2 drops |

The reactants were heated at 90°C. for about three hours in a nitrogen atmosphere. The resultant product had a hydroxyl value of about 15 and a Gardner-Holdt viscosity of $Z_2$_. The calculated OH/NCO equivalent ratio was 1.99.

The composition was applied over both a clean steel substrate and a primed foam substrate and was dried at 160°F. for about 30 minutes. The films exhibited excellent adhesion and Gardner impacts in excess of 160 inch pounds over both substrates.

EXAMPLE II

A reactor was charged with 2000 parts of VMP naphtha and 200 parts of methyl butyl ketone, and heated to reflux in a nitrogen atmosphere. After about 45 minutes at 120°C., the following blend was gradually added to the reactor:

|  | Parts by Weight |
| --- | --- |
| Methyl methacrylate | 3300 |
| Methacrylonitrile | 1000 |
| Lauryl methacrylate | 2064 |
| Hydroxyethyl acrylate | 744 |
| Butyl methacrylate | 744 |
| Methacrylic acid | 416 |
| Methyl butyl ketone | 3000 |
| Azobisisobutyronitrile (VAZO) | 90 |

The addition of the blend was complete after about 3 hours.

To the reaction mixture was gradually added a blend consisting of 750 parts of methyl butyl ketone and 25 parts of VAZO. The addition was complete after about one hour. The reaction mixture was held at about 120°C. for another hour, after which were added 30 parts of butylperoxy isopropyl carbonate. The temperature was maintained at about 120°C. for about 4 more hours, after which the product was allowed to cool. VMP naphtha (750 parts) was then added to the product. The resultant acrylic interpolymer had a hydroxyl value of about 24, a hydroxyl equivalent of 2337 and a Gardner-Holdt viscosity of Z.

A second reactor was charged with the following materials and was heated to 100°C. in a nitrogen atmosphere:

|  | Parts by Weight |
| --- | --- |
| Polycaprolactone diol (molecular weight 1250) | 783 |
| Isophorone diisocyanate | 230 |
| Dimethylolpropionic acid | 35 |
| Methyl butyl ketone | 561 |
| Dibutyltin dilaurate | 0.016 |

The isocyanate prepolymer had an NCO equivalent of 5363.

After about 2½ hours at 100°C., the following blend was added to the reactor:

| | Parts by Weight |
|---|---|
| Acrylic interpolymer | 1500 |
| Isopropanolamine | 14.4 |
| Methyl butyl ketone | 504 |
| Dibutyltin dilaurate | 0.08 |

The calculated OH/NCO equivalent ratio for the reactants (isocyanate prepolymer plus acrylic polymer) was 2.14.

The temperature in the reactor dropped to about 60°C. upon the above addition. The temperature was increased to about 85°C. and maintained there for about 2 hours. The temperature was then increased to about 90°C. and maintained there for about 8 hours. Butyl alcohol (99 parts) was then added to the reaction mixture. The temperature was maintained at about 90°C. for about 20 minutes, after which 28 parts of hydroxyethyl ethlenimine were added. The mixture was then heated at 100°C. for about one hour and was allowed to cool. Isopropyl alcohol (299 parts) was then added to the product. The resultant product had an acid value of about 6, a percent solids of about 44 (at 150°C.) and a Gardner-Holdt viscosity of Y+.

The composition was applied over both a clean steel substrate and a primed foam substrate and was dried at 160°F. for about 30 minutes. The film exhibited excellent adhesion and Gardner impact in excess of 160 inch-pounds over both substrates.

EXAMPLE III

A reactor was charged with 800 parts of methyl butyl ketone, and was heated to reflux in a nitrogen atmosphere. After about 20 minutes at 120°C., the following blend was gradually added to the reactor:

| | Parts by Weight |
|---|---|
| Butyl methacrylate | 990 |
| Methyl methacrylate | 165 |
| Hydroxyethyl acrylate | 165 |
| Methacrylic acid | 50 |
| Ethylhexyl acrylate | 280 |
| Azobisisobutyronitrile (VAZO) | 13 |
| Methyl butyl ketone | 600 |

The addition of the blend was complete after about three hours with the temperature being at about 130°C. during that period. To the reaction mixture was then gradually added a blend consisting of 300 parts of methyl butyl ketone and 5 parts of VAZO. The addition was complete after about one hour. The temperature was maintained at about 130°C. for another hour, after which 6 parts of BPIC were added. The temperature was maintained for another four hours, after which the product was allowed to cool. the resultant acrylic interpolymer had a hydroxyl value of about 48 and a Gardner-Holdt viscosity of C-D, and a hydroxyl equivalent of 1168.

A second reactor was charged with the following materials and was heated to 100°C. in a nitrogen atmosphere:

| | Parts by Weight |
|---|---|
| Polycaprolactone diol (molecular weight 1250) | 783 |
| Methyl butyl ketone | 560 |
| Bis(isocyanatocyclohexyl)methane | 276 |
| Dimethylolpropionic acid | 35 |
| Dibutyltin dilaurate | 0.016 |

The isocyanate prepolymer had an NCO equivalent of 4864.

After about 2½ hours at 100°C., 1500 parts of the above acrylic interpolymer and 500 parts of methyl butyl ketone were added, with the temperature in the reaction dropping to about 60°C. The reaction mixture is then heated to about 85°C. with the addition of 14.4 parts of isopropanolamine and 0.08 parts of dibutyltin dilaurate. Once the temperature reached about 85°C. (after about 1½ hours), the reaction mixture was heated to 95°C. After about 45 minutes at 95°C., 300 parts of Cellosolve acetate were added. The temperature was maintained at 95°C. for an additional 9 hours and was increased to 100°C. After about 2 hours and 45 minutes at 100°C., 100 parts of butyl alcohol were added. Twenty-five minutes later, 28 parts of hydroxyethylethylenimine were added. The mixture was maintained at 100°C. for another hour, after which it was allowed to cool. The resultant product had an acid value of about 4, a percent solids of about 46 (at 150°C.) and a Gardner-Holdt viscosity of $Z_1$-$Z_2$. The calcualted OH/NCO equivalent ratio for the acrylic interpolymer and the isocyanate prepolymer was 3.78.

The composition was applied over both a clean steel substrate and a primed foam substrate and was dried at 160°F. for about 30 minutes. The films exhibited excellent adhesion and Gardner impacts in excess of 160 inch-pounds over both substrates.

EXAMPLES IV-VII

Two isocyanate prepolymers were produced by blending the material set forth in the following table, and heating at 150°C. for 16 hours. The two prepolymers will be hereinafter referred to as Prepolymer A and Prepolymer B.

| | Poly(oxytetramethylene)glycol (Molecular Weight = 1000) | Methylcyclohexylene Diisocyanate |
|---|---|---|
| Prepolymer A | 250.0 parts by weight | 92 parts by weight |
| Prepolymer B | 437.0 parts by weight | 92 parts by weight |

The two prepolymers were then blended and processed as set forth in the following table. The acrylic interpolymer used in each instance consisted of 39.7 solids in methyl butyl ketone of an interpolymer of about 187 parts of methyl methacrylate and about 10 parts of hydroxypropyl methacrylate. The hydroxyl equivalent of the interpolymer is 3627. All parts in the table are by weight. In the table, MIBK represents methyl isobutyl ketone, ZnO is the zinc octoate and G-H represents the Gardner-Holdt viscosity of the product.

|     | Acrylic | Prepolymer A | Prepolymer B | MIBK | ZnO | Process | Gardner-Holdt Viscosity | OH/NCO Equivalent Ratio |
| --- | --- | --- | --- | --- | --- | --- | --- | --- |
| IV  | 500 | 87.5  | —     | 200 | 0.5 | Heated at about 110°C. for about 15 hours   | 0  | 1.042  |
| V   | 500 | 135.0 | —     | 200 | 1.0 | Heated at about 110°C. for about 9½ hours   | V  | 0.67*  |
| VI  | 500 | —     | 87.5  | 200 | 0.5 | Heated at about 110°C. for about 20 hours   | M  | 5.74   |
| VII | 500 | —     | 135.0 | 200 | 1.0 | Heated at about 110°C. for about 22 hours   | Z2 | 3.72   |

*This example shows an ungelled reaction product even though the OH/NCO equivalent ratio is less than 1. This is probably due to the presence of moisture in the system which is very reactive with NCO groups. Infrared analysis shows the product to be NCO free.

The four compositions were then applied to clean steel substrates and primed steel substrates, and were dried at 250°F. for 30 minutes. The primer used was based on a mixture of a saturated polyester and a melamine resin. The resultant films had the Gardner impacts (Gardner Impact Tester IG-1120, Gardner Laboratories, Bethesda, Maryland) and adhesion characteristics shown in the following table:

|                          | IV              | V               | VI              | VII             |
| ---                      | ---             | ---             | ---             | ---             |
| Adhesion                 |                 |                 |                 |                 |
| Clean                    | Poor            | Poor            | Poor            | Poor            |
| Primed                   | Excellent       | Excellent       | Excellent       | Excellent       |
| Gardner Impact           |                 |                 |                 |                 |
| Primed                   | 10 inch pounds  | 20 inch pounds  | 10 inch pounds  | 20 inch pounds  |

EXAMPLE VIII

For the purposes of comparison, the coating composition such as described in Example I of U.S. Pat. No. 3,531,364 was prepared.

A terpolymer solution was made by reacting a monomer charge ratio of 13 weight percent beta-hydroxy ethyl methacrylate, 34 percent methyl acrylate, 53 percent by weight methyl methacrylate at a 25 percent monomer concentration in methyl isobutyl ketone. The solids content of the polymer as prepared was about 40.5 percent. The terpolymer had a hydroxyl equivalent of 4000. A portion of the polymer was diluted further with methyl isobutyl ketone to produce a solution with a solids content of 25 percent by weight.

An NCO prepolymer was prepared by reacting two equivalents of hexamethylene diisocyanate with one equivalent of an approximately 2150 molecular weight (average) polyester, dihydroxy-terminated, made by reacting a blend of an excess of 60 weight percent ethylene glycol and 40 weight percent butylene glycol with adipic acid. Dibutyltin dilaurate 0.05 percent by weight was used to catalyze the reaction. The NCO prepolymer had a hydroxyl equivalent of 1243.

Ten grams of the NCO prepolymer was mixed with 30 grams of the terpolymer solution and then 0.02 gram of dibutyltin dilaurate catalyst was stirred in. The buildup in viscosity is shown in the table below.

Table I

| Viscosity Buildup as a Function of Time | |
| --- | --- |
| Time | Gardner-Holdt Viscosity |
| freshly mixed | U-V |
| 10 minutes | X-Y |
| 20 minutes | Z' |

Table I-continued

| Viscosity Buildup as a Function of Time | |
| --- | --- |
| Time | Gardner-Holdt Viscosity |
| 70 minutes | gel |

The significance of the above experiment shows that the reaction mixture disclosed in Example I of U.S. Pat. No. 3,531,364 rapidly crosslinks to form a gelled thermosetting product after only 70 minutes after adding catalyst.

When the above experiment was repeated without the addition of catalyst, the reaction mixture gelled within an hour showing once again the reaction mixture depicted by working Example I of U.S. Pat. No. 3,531,364 is a gelled thermosetting system.

EXAMPLES IX–XIII

To show the improvement of the present invention over the teachings of U.S. Pat. No. 3,531,364, a series of coating compositions were prepared with the isocyanate-terminated prepolymer and the terpolymer described in working Example VIII above. The compositions which were prepared were as follows:

| Example No. | IX | X | XI | XII | XIII |
| --- | --- | --- | --- | --- | --- |
| NCO terminated prepolymer (parts by weight) | 4 | 8 | 12 | 16 | 20 |
| terpolymer (parts by weight) | 120* | 120* | 120* | 120* | 120* |
| OH/NCO equivalent ratio | 9.37 | 4.68 | 3.12 | 2.34 | — |

*With the terpolymer, 120 parts by weight of solution was used in all examples. Since the solution was a 25 percent solids, approximately 30 parts by weight of terpolymer was used in each example.

The polymers were well mixed and reacted with one another at 50°C. and the reactions were terminated at various times with a mixture of 6 parts by weight of n-butyl alcohol, 14 parts by weight of isopropyl alcohol and 0.28 parts by weight of ethanolamine.

The reaction of IX, X, and XI was terminated after two hours, the reaction of XII was terminated after 1.5 hours, and the reaction of XIII gelled within one hour of mixing.

The reaction products of Examples IX, X, XI, and XII were mixed with 43 parts by weight of N-methyl-2-pyrrolidone and mixed well. The reaction products were kept at 60°C. for 15 hours and after 15 hours, the reaction products had not gelled and flowed well. The properties of the reaction products were as follows:

Table II

| Example No. | Percent Solids | Resin Properties Gardner-Holdt Viscosity | Sprayability | Intrinsic Viscosity |
|---|---|---|---|---|
| IX | 19.1% | A | 13% | 0.94 |
| X | 20.99% | H | 8% | 0.97 |
| XI | 23.59% | U | — | — |
| XII | 23.71% | T | 3% | — |

EXAMPLES XIV–XIX

To show that the invention is applicable to the preparation of thermoplastic polymers without the need to terminate the reaction such as described in the above examples, the following examples were prepared with the terpolymer such as described in working Example I of U.S. Pat. No. 3,531,364 and the following isocyanate-terminated prepolymer.

The polyurethane prepolymer was prepared by reacting 716 parts by weight of a 2150 molecular weight (average) polyester, dihydroxy-terminated, made by reacting a blend of an excess of 60 weight percent ethylene glycol and 40 weight percent butylene glycol with adipic acid. The polyester diol was reacted with 28 parts by weight of hexamethylene diisocyanate in the presence of 0.037 parts by weight of dibutyltin dilaurate. The reaction mixture was kept at 200°F. for 4 hours. Infrared analysis indicated no free NCO groups.

The polyurethane prepolymer prepared immediately above (744 parts by weight) was then mixed with 56 parts by weight of hexamethylene diisocyanate and 89 parts by weight of methyl isobutyl ketone solvent. The reaction mixture was kept at 200°F. for 4 hours to yield an NCO prepolymer solution having 90 percent by weight solids mixture.

Various parts by weight of the polyurethane prepolymer and the acrylic terpolymer were blended together and heated for 15 hours at 60°C. The results of this thermal treatment are summarized in the table below.

Table III

| Example No. | Parts by Weight of Polyurethane Prepolymer | 2-ethyl hexanol | Parts by Weight Acrylic Terpolymer | Gardner-Holdt Viscosity after 18 hours at 60°C. | OH/NCO Equivalent Ratio |
|---|---|---|---|---|---|
| XIV | 0.28 | 0 | 30 | G | 75/1 |
| XV | 0.56 | 0 | 30 | T | 35.7/1 |
| XVI | 1.1 | 0 | 30 | gel | — |
| XVII | 2.1 | 0 | 30 | gel | — |
| XVIII | 3.3 | 1 part by wt.* | 30 | gel | — |
| XIX | 4.4 | 1 part by wt. | 30 | gel | — |

*NCO chain terminator added to the reaction mixture to prevent gelling, not successful as OH equivalent of acrylic interpolymer believed to be too high.

We claim:

1. A storage-stable, ungelled, thermoplastic coating composition comprising the reaction product of:
   A. 1–30 percent by weight of an organic polyisocyanate;
   B. 4–50 percent by weight of a polymeric polyol having a glass transition temperature of less than about 50°C.; and
   C. 30–95 percent by weight of an interpolymer having a hydroxyl value of about 60 or less derived from:
      1. a hydroxyalkyl ester of an ethylenically unsaturated carboxylic acid; and
      2. at least one copolymerizable ethylenically unsaturated monomer;
   the NCO/OH equivalent ratio in said reactants being less than 1/1 and said reaction product having an intrinsic viscosity of 1.2 deciliters per gram or less.

2. The composition of claim 1 wherein said hydroxyalkyl ester is selected from the group consisting of hydroxyalkyl acrylates and methacrylates.

3. The composition of claim 2 wherein said hydroxyalkyl ester is selected from the group consisting of hydroxyethyl acrylate, hydroxyethyl methacrylate, hydroxypropyl acrylate and hydroxypropyl methacrylate.

4. The composition of claim 2 wherein said polymeric polyol has a molecular weight of from about 200 to about 5000.

5. The composition of claim 2 wherein said polymeric polyol is a polyether polyol.

6. The composition of claim 2 additionally containing a low molecular weight polyol having a molecular weight of less than 200.

7. The composition of claim 2 wherein said polymeric polyol is a polyester polyol.

8. The composition of claim 2 wherein said polymeric polyol is a condensate of caprolactone and a polyalcohol.

9. The composition of claim 1 which contains a terminating agent selected from the group consisting of primary and secondary amines, monofunctional alcohols, and alcohol amines.

10. A storage-stable, ungelled, thermoplastic coating composition comprising the reaction product of:
    A. 1–30 percent by weight of an organic polyisocyanate;
    B. 4–50 percent by weight of a polymeric polyol having a glass transition tempereature of less than about 50°C.;
    C. 2–20 percent by weight of a hydroxyalkyl ester of an ethylenically unsaturated carboxylic acid; and
    D. 25–90 percent by weight of at least one copolymerizable ethylenically unsaturated monomer;
    the NCO/Oh equivalent ratio in said reactants being less than 1/1 and said reaction product having an intrinsic viscosity of 1.2 deciliters per gram or less.

11. A method of producing an ungelled, storage-stable, thermoplastic, extensible coating composition comprising:
    A. reacting a mixture of:
       1. 1–30 percent by weight of an organic polyisocyanate with
       2. 4–50 percent by weight of a polymeric polyol having a glass transition temperature of less than about 50°C., and 3. 35–95 percent by weight of an interpolymer having a hydroxyl value of about 60 or less derived from:
   i. a hydroxyalkyl ester of an ethylenically unsaturated carboxylic acid; and
   ii. at least one copolymerizable ethylenically unsaturated monomer;

the NCO/OH equivalent ratio in said reactants being less than 1/1; and

B. terminating the reaction when the intrinsic viscosity of the reaction mixture is 1.2 deciliters per gram or less.

12. The metthod of claim 11 wherein the isocyanate and polymeric polyol are pre-reacted and subsequently reacted with the interpolymer and wherein the equivalent ratio of isocyanate to hydroxyl in the pre-reaction mixture is from 1.1:1 to 3:1.

13. The method of claim 12 wherein the equivalent ratio of isocyanate to hydroxyl in the reaction with the interpolymer is from about 1:1 to about 1:9.

14. The method of claim 11 wherein the equivalent ratio of isocyanate to hydroxyl in the reaction mixture is from about 1:1.1 to about 1.9.

15. A method of producing an ungelled, storage-stable, thermoplastic, extensible coating composition comprising:
A. reacting a mixture of:
   1. 1–30 percent by weight of an organic polyisocyanate;
   2. 4–50 percent by weight of a polymeric polyol having a glass transition temperature of less than about 50°C.;
   3. 2–20 percent by weight of a hydroxyalkyl ester of an ethylenically unsaturated carboxylic acid; and
   4. 25–90 percent by weight of at least one copolymerizable ethylenically unsaturated monomer;

the NOC/OH equivalent ratio in said reactants being less than 1/1; and

B. terminating the reaction when the intrinsic viscosity of the reaction mixture is 1.2 deciliters per gram or less.

* * * * *